(12) United States Patent
Uchiyama

(10) Patent No.: US 10,642,439 B2
(45) Date of Patent: May 5, 2020

(54) RESISTIVE TOUCH PANEL DETECTING TOUCH BASED ON VARIATION OF TRANSMISSION PATH, COMPOSITE TOUCH PANEL, METHOD OF DRIVING TOUCH PANEL, AND DISPLAY APPARATUS

(71) Applicant: NLT Technologies, Ltd., Kanagawa (JP)

(72) Inventor: Yuichi Uchiyama, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 387 days.

(21) Appl. No.: 14/976,470

(22) Filed: Dec. 21, 2015

(65) Prior Publication Data

US 2016/0188050 A1 Jun. 30, 2016

(30) Foreign Application Priority Data

Dec. 26, 2014 (JP) .................. 2014-263822

(51) Int. Cl.
  *G06F 3/045* (2006.01)
  *G06F 3/044* (2006.01)
  *G06F 3/041* (2006.01)

(52) U.S. Cl.
  CPC .............. *G06F 3/045* (2013.01); *G06F 3/044* (2013.01); *G06F 3/0416* (2013.01);
  (Continued)

(58) Field of Classification Search
  CPC ........ G06F 3/041; G06F 3/0416; G06F 3/044; G06F 3/045; G06F 2203/04103;
  (Continued)

(56) References Cited

U.S. PATENT DOCUMENTS 4,963,702 A * 10/1990 Yaniger .................. G06F 3/045
                                                        178/18.05
6,178,094 B1   1/2001 Hakozaki
                (Continued)

FOREIGN PATENT DOCUMENTS

JP    2000-049475    2/2000
JP    2009-116849    5/2009
                (Continued)

OTHER PUBLICATIONS

Japanese Office Action for Application No. 2014-263822, dated Jun. 12, 2018, with English Translation provided.

*Primary Examiner* — Keith L Crawley
(74) *Attorney, Agent, or Firm* — Young & Thompson

(57) ABSTRACT

A resistive touch panel includes a first substrate provided with a transparent conductive film electrically floating on an entire surface thereof, a second substrate provided with a plurality of strip-shaped electrodes made of a transparent conductive film at a predetermined interval so that the transparent conductive film of the second substrate faces the transparent conductive film of the first substrate, and a detection section for detecting a ratio in which a signal transmitted to a first strip-shaped electrode of the second substrate is attenuated through a transmission path reaching a second strip-shaped electrode of the second substrate adjacent to the first strip-shaped electrode via the transparent conductive film of the first substrate from the first strip-shaped electrode.

17 Claims, 21 Drawing Sheets

(52) U.S. Cl.
CPC .............. *G06F 2203/04104* (2013.01); *G06F 2203/04106* (2013.01); *G06F 2203/04107* (2013.01)

(58) Field of Classification Search
CPC . G06F 2203/04104; G06F 2203/04106; G06F 2203/04107; G06F 2203/04113
See application file for complete search history.

(56) References Cited

U.S. PATENT DOCUMENTS

| | | | | |
|---|---|---|---|---|
| 2009/0096762 | A1* | 4/2009 | Hinata | G06F 3/044 345/174 |
| 2010/0110039 | A1* | 5/2010 | Li | G06F 3/0416 345/174 |
| 2011/0148800 | A1* | 6/2011 | Nishikawa | B32B 7/12 345/173 |
| 2011/0234508 | A1 | 9/2011 | Oda et al. | |
| 2015/0091859 | A1* | 4/2015 | Rosenberg | G06F 3/044 345/174 |
| 2015/0185946 | A1* | 7/2015 | Fourie | G06F 3/0416 345/174 |
| 2015/0309651 | A1* | 10/2015 | Papakostas | G06F 3/0414 345/174 |
| 2016/0048245 | A1* | 2/2016 | Papakostas | G06F 3/045 345/174 |
| 2016/0253026 | A1* | 9/2016 | Long | G03F 7/20 345/174 |

FOREIGN PATENT DOCUMENTS

| | | |
|---|---|---|
| JP | 2011-209785 | 10/2011 |
| JP | 3173195 | 1/2012 |
| JP | 2012-059091 | 3/2012 |
| JP | 2012-138002 | 7/2012 |
| JP | 2013-168032 | 8/2013 |

* cited by examiner

RESISTIVE TOUCH PANEL DETECTING TOUCH BASED ON VARIATION OF TRANSMISSION PATH, COMPOSITE TOUCH PANEL, METHOD OF DRIVING TOUCH PANEL, AND DISPLAY APPARATUS

CROSS-REFERENCE TO RELATED APPLICATIONS

This non-provisional application claims priority under 35 U.S.C. § 119(a) on Patent Application No. 2014-263822 filed in Japan on Dec. 26, 2014, the entire contents of which are hereby incorporated by reference.

TECHNICAL FIELD

The present invention relates to a resistive touch panel, a composite touch panel in which the resistive touch panel and another type of touch panel are combined with each other, a method of driving these touch panels, and a display apparatus comprising these touch panels.

BACKGROUND

As an input means of various devices, different types of touch panels such as a resistive, an electromagnetic induction, an optical, or a capacitive touch panel are widely employed. Among these, the resistive touch panel is inexpensive, and allows inputting by a stylus pen without electrical conductivity, however, it has a drawback in that a two-point simultaneous touch cannot be detected. For this problem, Japanese Patent Laid-Open Publication No. 2012-59091 discloses a resistive touch panel which comprises: an upper substrate where an upper conductive layer is formed on a lower surface thereof, and a lower substrate where a lower conductive layer is formed on an upper surface thereof so that lower conductive layer faces the upper conductive layer at a predetermined gap, wherein the upper conductive layer is provided on an entire surface of the lower surface of the upper substrate, and a plurality of the lower conductive layers are arranged on the upper surface of the lower substrate in a substantially strip shape at a predetermined interval, so as to allow the resistive touch panel to detect the two-point simultaneous touch.

In addition, a projected capacitive touch panel (hereinafter, PCAP) of the capacitive types allows a simultaneous multi-point input operation often referred to as a flick, pan, or zoom which is a basic operation of touch input, and has been widely employed in a smartphone, tablet terminal, and the like in recent years.

However, since the PCAP is generally disposed on a liquid crystal display (hereinafter, LCD), it is known that the PCAP is affected by radiation noise occurring from the LCD, thereby a malfunction may occur. In addition, the PCAP does not operate with a non-conductive thick glove or a stylus pen not having electrical conductivity, and has a drawback that a malfunction resulting from an unintentional touch by a finger which is judged as an input may easily occur. Therefore, in order to compensate for the drawback of the PCAP, a composite touch panel has been proposed, in which an alternative type of touch panel such as the resistive, electromagnetic induction, or optical touch panel is combined with the PCAP, thereby also allowing for an input means which has difficulties in responding by a single PCAP to reliably response the touch input.

In relation to the above-described composite touch panel, for example, Japanese Utility Model Registration No. 3173195 discloses a laminate structure of a multi touch pad which comprises: a surface layer having a high transmittance and flexibility; a first transparent sensor layer provided with a plurality of first axial traces which are arranged so as to be parallel with each other; an insulation layer having a high transmittance and flexibility; a second transparent sensor layer provided with a plurality of second axial traces which are arranged so as to be parallel with each other; a third transparent sensor layer where a plurality of space balls are placed on a surface thereof; and a substrate having light transmission, wherein the respective layers are superimposed according to an order to form a transparent plate body, the first axial trace and the second axial trace are placed so as to be oriented 90 degrees with respect to each other, and the second sensor layer and the third sensor layer are disposed to face apart from each other at a constant interval by the space balls placed therebetween.

In addition, Japanese Patent Laid-Open Publication No. 2013-168032 discloses a touch panel which comprises: a first conductive film having a plurality of isolation regions formed in a strip shape long in one direction; a second conductive film having a plurality of isolation regions formed in a strip shape long in the other direction which is substantially orthogonal to the one direction; and a third conductive film, wherein the isolation regions in the first conductive film are aligned in the other direction, the isolation regions in the second conductive film are aligned in the one direction, and a detection of coordinate positions due to a capacitance coupling is performed by the first conductive film and the second conductive film.

SUMMARY

FIG. 1 is a perspective view illustrating a configuration of the resistive touch panel of the Japanese Patent Laid-Open Publication No. 2012-59091. In this publication, as illustrated in FIG. 1, a transparent conductive film (an upper conductive layer 51) is disposed on the entire surface of the upper substrate (an upper substrate 50) of the resistive touch panel, and divided transparent conductive films (lower conductive layers 53) are disposed on the lower substrate (a lower substrate 52). By applying a potential gradient to an electrode of the lower substrate 52, the two-point simultaneous touch (A and B in FIG. 1) can be detected. However, in order to apply the potential gradient to the electrode of the lower substrate 52, there is a need to apply a voltage from both ends of the electrode. Therefore, there are problems that routing of a wiring is complicated, and downsizing of a driving section cannot be achieved, as well as the two-point simultaneous touch cannot be detected on the same electrode.

FIGS. 2 and 3 are cross-sectional views illustrating a configuration of the multi touch pad of the Japanese Utility Model Registration No. 3173195. In this publication, as illustrated in FIG. 2, a composite touch panel is achieved by bonding the capacitive touch panel (an X-axis sensor layer 60 and a Y-axis sensor layer 61) and the resistive touch panel (a resistive sensor layer 62). In addition, as illustrated in FIG. 3, by using a conductive film (the Y-axis sensor layer 61) of a rear surface of the capacitive touch panel also as an upper substrate of the resistive touch panel, it allows the device to be further thinned and light weighted. However, the multi touch pad has problems that both of the upper substrate and the lower substrate are used as a driving method of a resistive touch panel, and when in-plane resistance of any one of these substrates is significantly low, the accuracy of position detection may be deteriorated. In addition, there are also problems that since the Y-axis sensor layer 61 and the resistive sensor layer 62 have insufficient shielding function, it is not possible to control the malfunction of the capacitive touch panel due to the radiation noise occurring from the LCD. Further, there is a problem that, when the position cannot be detected by the capacitive touch panel, it is not possible to detect the two-point simultaneous touch.

FIG. 4 is a perspective view illustrating a configuration of the composite touch panel of Japanese Patent Laid-Open Publication No. 2013-168032. In this publication, as illustrated in FIG. 4, by using a conductive film (a second transparent conductive film 71) of the rear surface of the capacitive touch panel (a first transparent conductive film 70 and a second transparent conductive film 71) also as the upper substrate of the resistive touch panel (a third transparent conductive film 72), thinning and light weighting are achieved, and the lower substrate (a fourth transparent conductive film 73) of the resistive touch panel decreases the radiation noise occurring from the LCD (a display apparatus 74) with respect to the PCAP. However, this composite touch panel has problems that connecting all the four conductive layers to an outside is required, and the connection structure is complicated. In addition, there is the problem that, when the position cannot be detected by the capacitive touch panel, the two-point simultaneous touch cannot be detected.

According to one aspect of the present invention, there is provided a resistive touch panel, comprising: a first substrate including a transparent conductive film electrically floating on an entire surface thereof; a second substrate including a plurality of strip-shaped electrodes made of a transparent conductive film at a predetermined interval so that the transparent conductive film of the second substrate faces the transparent conductive film of the first substrate; and a detection section configured to detect a ratio in which a signal transmitted to a first strip-shaped electrode of the second substrate is attenuated through a transmission path reaching a second strip-shaped electrode of the second substrate adjacent to the first strip-shaped electrode via the transparent conductive film of the first substrate from the first strip-shaped electrode.

According to another aspect of the present invention, there is provided a method of driving a resistive touch panel which comprises a first substrate including a transparent conductive film electrically floating on an entire surface thereof, and a second substrate including a plurality of strip-shaped electrodes made of a transparent conductive film at a predetermined interval so that the transparent conductive film of the second substrate faces the transparent conductive film of the first substrate, wherein the strip-shaped electrodes include a plurality of transmission electrodes and a plurality of reception electrodes which are alternately arranged, and the resistive touch panel further comprises a plurality of transmission section configured to transmit a signal to the plurality of transmission electrodes, and a plurality of reception sections configured to receive a signal from the plurality of reception electrodes, and each transmission electrode is connected with one or a plurality of the transmission sections, and each reception electrode is connected with one or a plurality of the reception sections, comprising: sequentially transmitting a pulse signal to the corresponding transmission electrode by the plurality of the transmission sections; receiving the pulse signal by the reception section connected to the reception electrode adjacent to the transmission electrode to which the pulse signal is transmitted; and specifying a touch position based on the received pulse signal.

According to further another aspect of the present invention, there is provided a method of driving a composite touch panel which comprises a resistive touch panel driven by the above-mentioned driving method, and a capacitive touch panel disposed on a side of the first substrate of the resistive touch panel, comprising intermittently driving the capacitive touch panel, and driving the resistive touch panel at timing in which the capacitive touch panel is not driven, to simultaneously perform a touch position determination by the capacitive touch panel and a touch position determination by the resistive touch panel.

It is to be understood that both the foregoing general description and the following detailed description are exemplary and explanatory and are not restrictive of the invention.

The above and further objects and features will more fully be apparent from the following detailed description with accompanying drawings.

DETAILED DESCRIPTION

Figure 1:
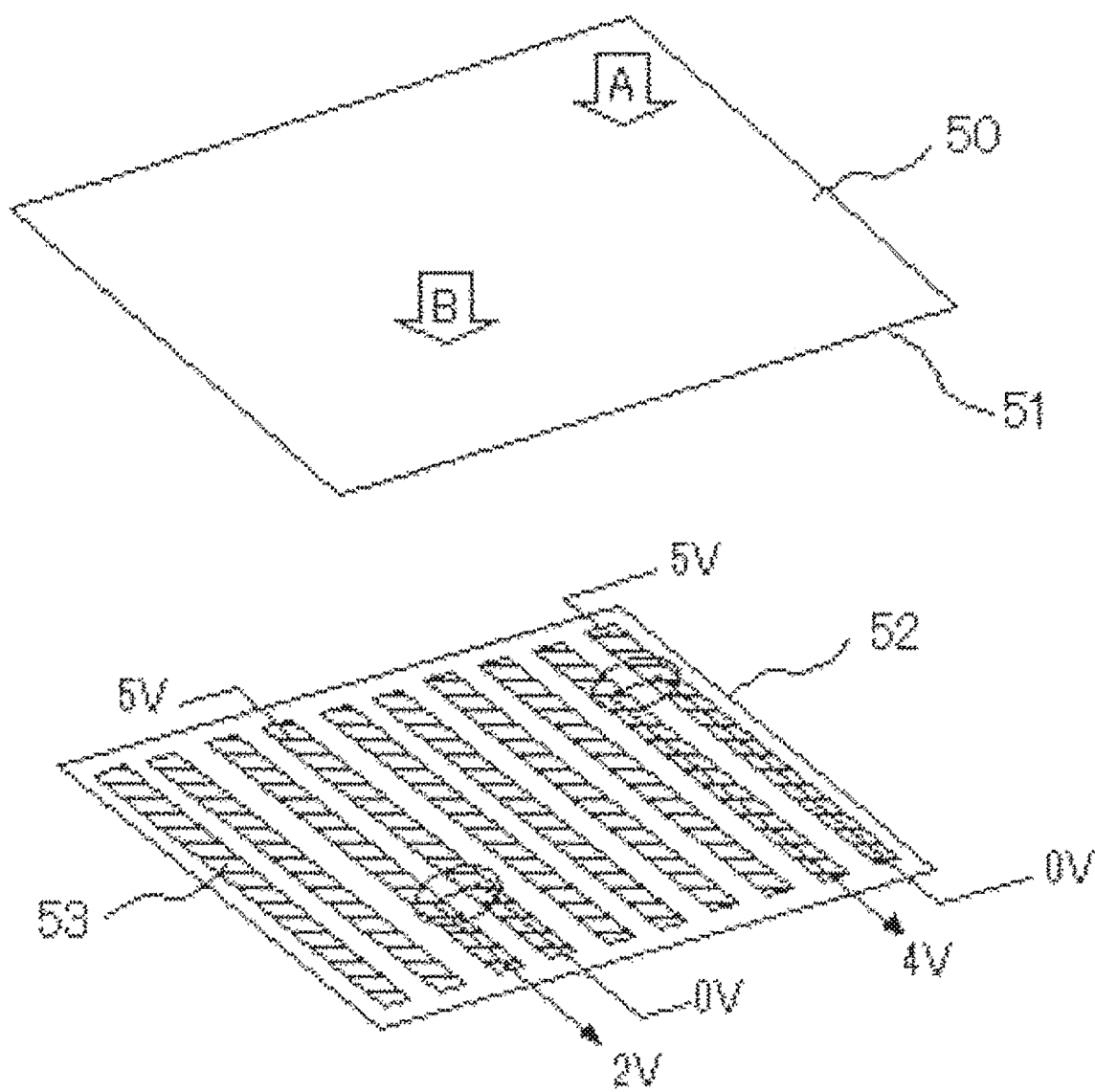
FIG. 1 is a representative view of Japanese Patent Laid-Open Publication No. 2012-59091.
Figure 2:
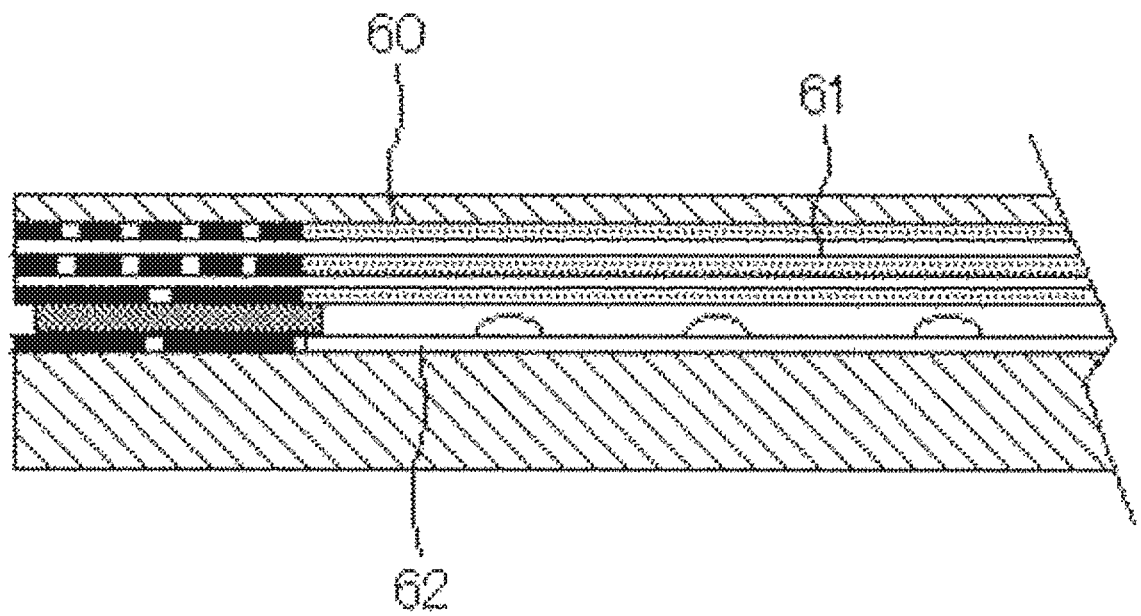
FIG. 2 is a representative view of Japanese Utility Model Registration No. 3173195.
Figure 3:
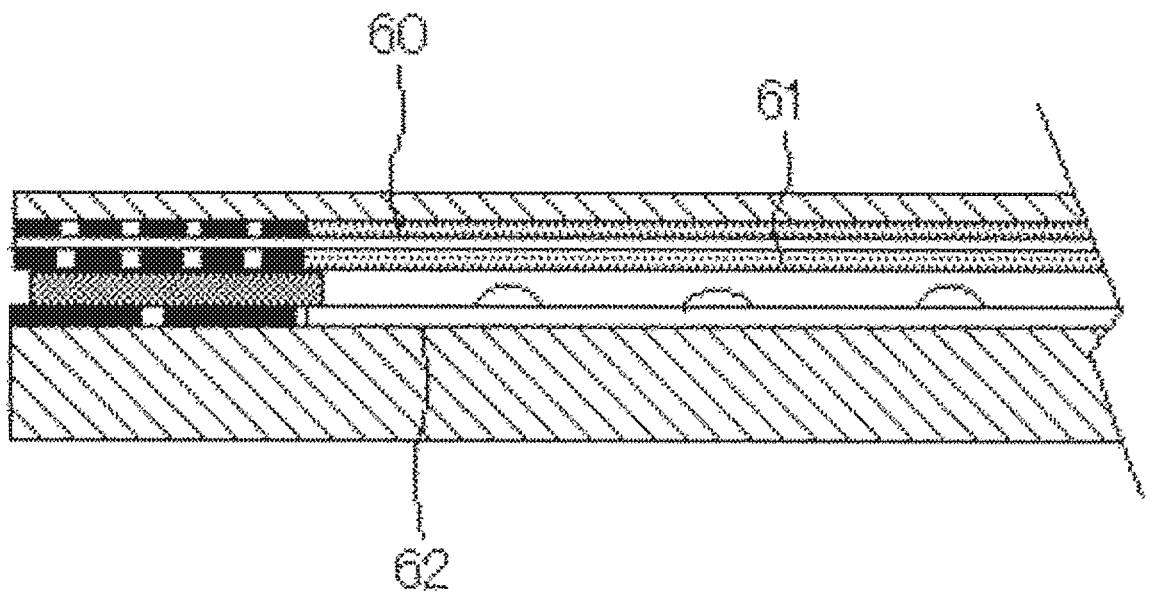
FIG. 3 is another view (an example of thinning and weight lighting) of the Japanese Utility Model Registration No. 3173195.
Figure 4:
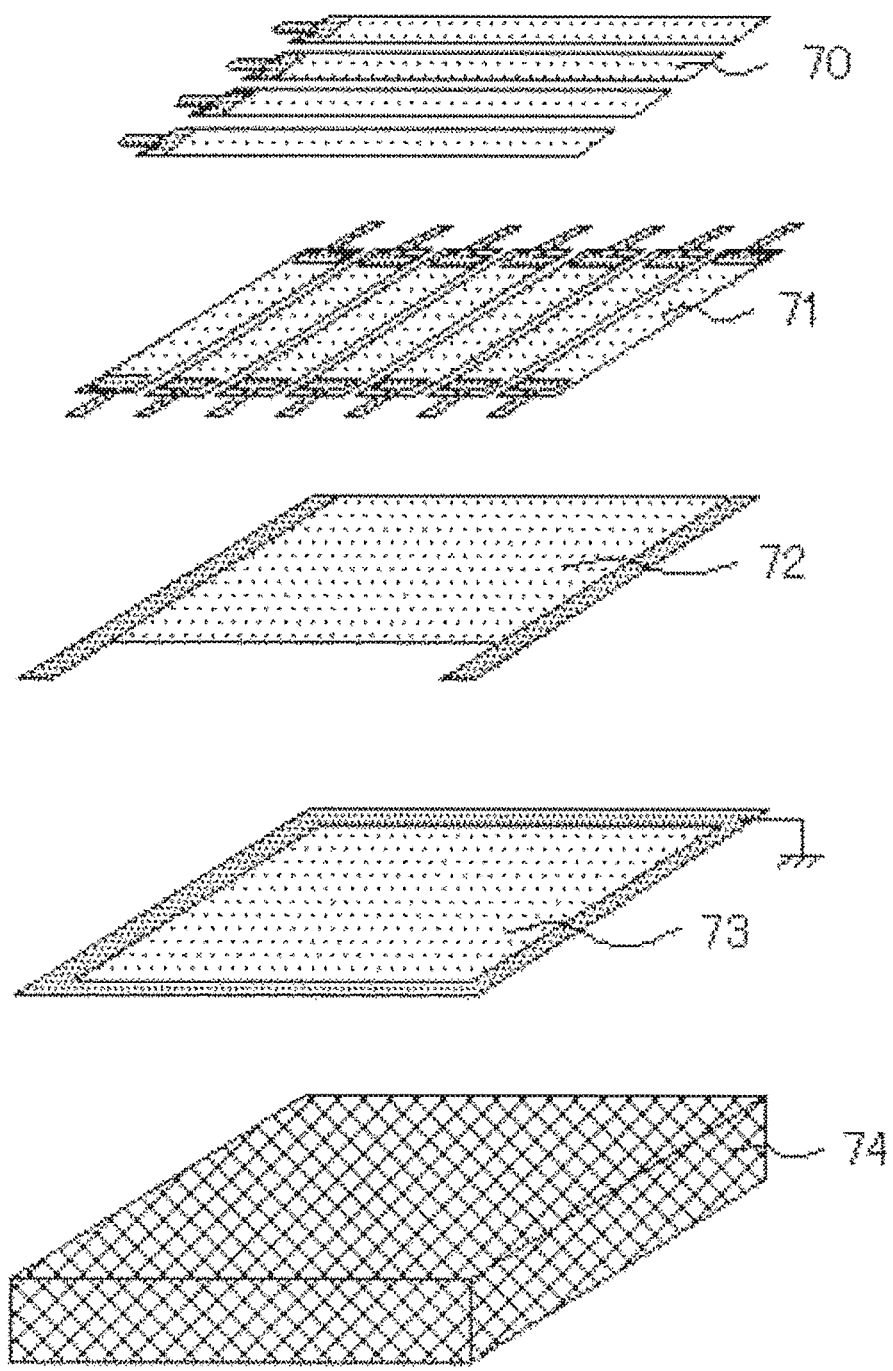
FIG. 4 is a representative view of Japanese Patent Laid-Open Publication No. 2013-168032.

As illustrated in the background, Japanese Patent Laid-Open Publication No. 2012-59091 proposes the resistive touch panel capable of detecting the two-point touch. However, this configuration has problems that the routing of a wiring is complicated, and the downsizing of the driving section cannot be achieved, as well as the two-point simultaneous touch cannot be detected on the same electrode. In addition, Japanese Utility Model Registration No. 3173195 and Japanese Patent Laid-Open Publication No. 2013-168032 propose the composite touch panel in which the capacitive touch panel and the resistive touch panel are combined with each other. However, these composite touch panels have the problems that it is not possible to sufficiently control the radiation noise occurring from the LCD, or the like by a simple structure, and when a position cannot be detected by the capacitive touch panel, the two-point simultaneous touch cannot be detected.

Therefore, in one embodiment, a resistive touch panel is configured in such a manner that an overall transparent conductive film electrically floating is disposed on an entire surface of an upper substrate, and a plurality of divided transparent conductive films are disposed on a lower substrate facing the upper substrate (for example, a transparent conductive film is divided into a plurality of electrodes in a strip shape in a Y direction, and the divided electrodes are alternately allocated to a transmission electrode, a reception electrode, another transmission electrode, and . . . in this order). Thereby, the concept of an X electrode and a Y electrode is not necessary, and based on a contact between the overall transparent conductive film electrically floating and the strip-shaped electrode, an input coordinate is determined only by the lower substrate.

Specifically, in a case where a pulse waveform is transmitted from a transmission section to the transmission electrode, or a constant voltage is applied thereto, when a depression input is performed, the overall transparent conductive film of the upper substrate functions as a bridge between the transmission electrode and the reception electrode, such that a voltage value attenuated according to a resistance value on a signal transmission path is detected by the reception section. Accordingly, a coordinate in an X direction (a longitudinal direction of the strip) may be determined based on the voltage value detected by the reception section, and a coordinate in the Y direction may be determined based on a position of the reception electrode. In addition, by comparing an attenuation of the voltage value in detail, a simultaneous multi-point input may be detected.

In the above-described structure, since the overall transparent conductive film of the upper substrate has no need for patterning, the resistive touch panel can be formed at a lower cost without occurring an unnecessary cost. Further, since the position detection accuracy of the resistive touch panel depends only on a deviation in an in-plane thickness due to the deposition of the transparent conductive film of the lower substrate, and is not significantly affected by the deviation or variation in an in-plane resistance of the transparent conductive film of the upper substrate, it is possible to improve the position detection accuracy.

In addition, when combining the above-described resistive touch panel with the projected capacitive touch panel, the transparent conductive film of the upper substrate of the resistive touch panel may be used as a shield layer, and therefore, a composite touch panel having a simple configuration may be easily formed.

Further, since a resistance value of the overall transparent conductive film of the resistive touch panel may be freely designed, the resistance value is optimized, and thereby the radiation noise occurring from the LCD, or the like may be effectively decreased. Therefore, it is possible to form the composite touch panel capable of effectively controlling the malfunction due to the radiation noise.

Furthermore, when inputting by the non-conductive thick glove which does not react with the projected capacitive touch panel or the stylus pen not having electrical conductivity, it is possible to detect an input by the resistive touch panel, and therefore, to provide a touch panel corresponding to the various input means.

Embodiment 1

In order to describe the above one embodiment in more detail, a resistive touch panel according to Embodiment 1, a driving method thereof, and a display apparatus comprising the resistive touch panel will be described with reference to FIGS. 5 to 14.

Figure 5:
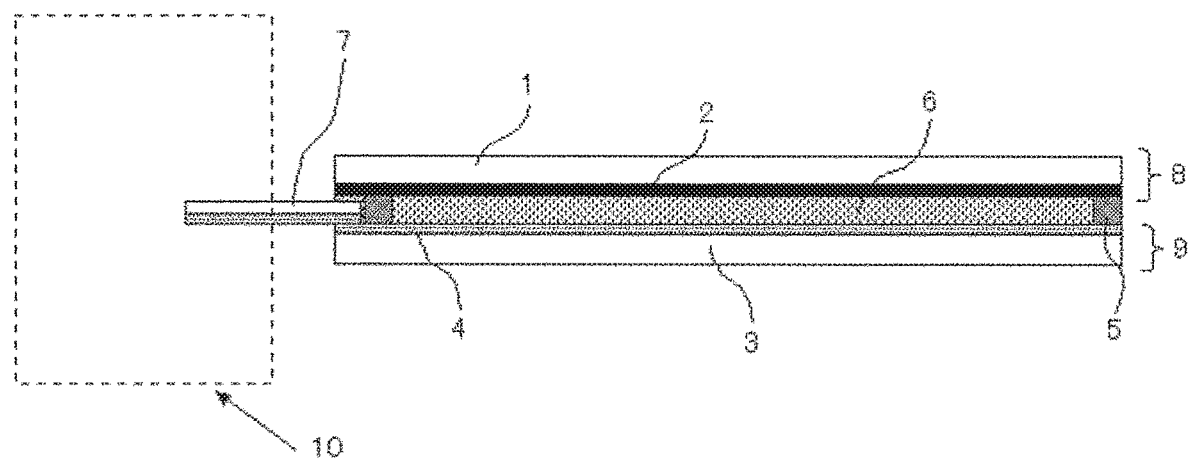
FIG. 5 is a transverse cross-sectional view illustrating a configuration of a resistive touch panel according to Embodiment 1.
Figure 7:
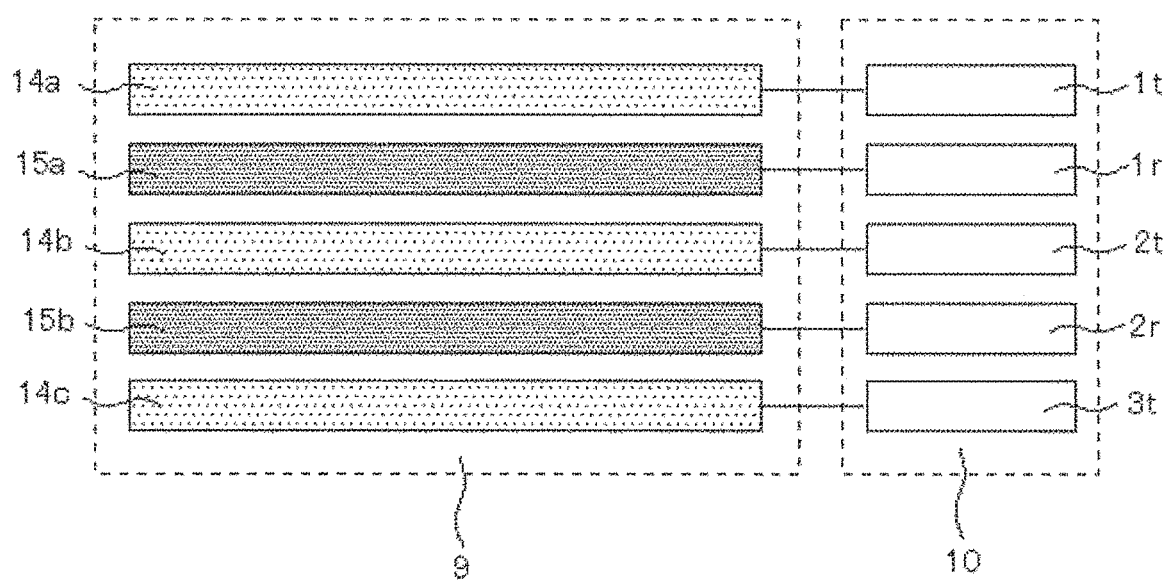
FIG. 7 is a plan view illustrating an arrangement of bottom-plate sensor electrodes according to Embodiment 1.
Figure 8:
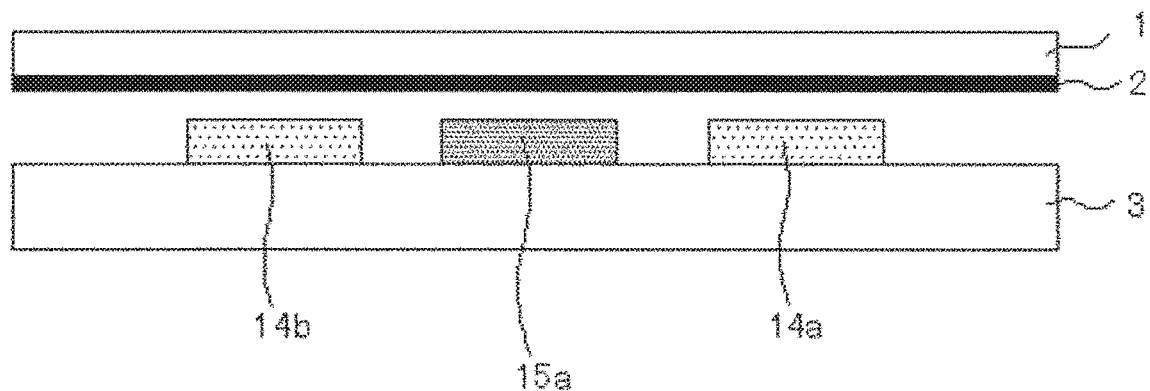
FIG. 8 is a transverse cross-sectional view illustrating an overall transparent conductive film and the bottom-plate sensor electrodes of the resistive touch panel according to Embodiment 1.

First, a configuration of the resistive touch panel of Embodiment 1 will be described with reference to FIGS. 5 to 8. FIG. 5 is a transverse cross-sectional view illustrating a configuration of the resistive touch panel according to Embodiment 1, FIG. 6 is a perspective view illustrating a positional relation between sensor substrates of the resistive touch panel, FIG. 7 is a plan view illustrating an arrangement (a part of FIG. 6) of bottom-plate sensor electrodes of the resistive touch panel, and FIG. 8 is a transverse cross-sectional view illustrating the positional relation (a part of FIG. 7) between an overall transparent conductive film and the bottom-plate sensor electrodes of the resistive touch panel.

In the resistive touch panel of Embodiment 1, first, an overall transparent conductive film 2 is formed, by using a conductive material such as indium tin oxide (ITO), on a surface of an upper-plate sensor substrate 1 (a first substrate) of the resistive touch panel made of a transparent substrate such as a glass substrate or a plastic substrate, to prepare an upper substrate (an upper-plate sensor 8) of the resistive touch panel (see FIG. 5).

Figure 6:
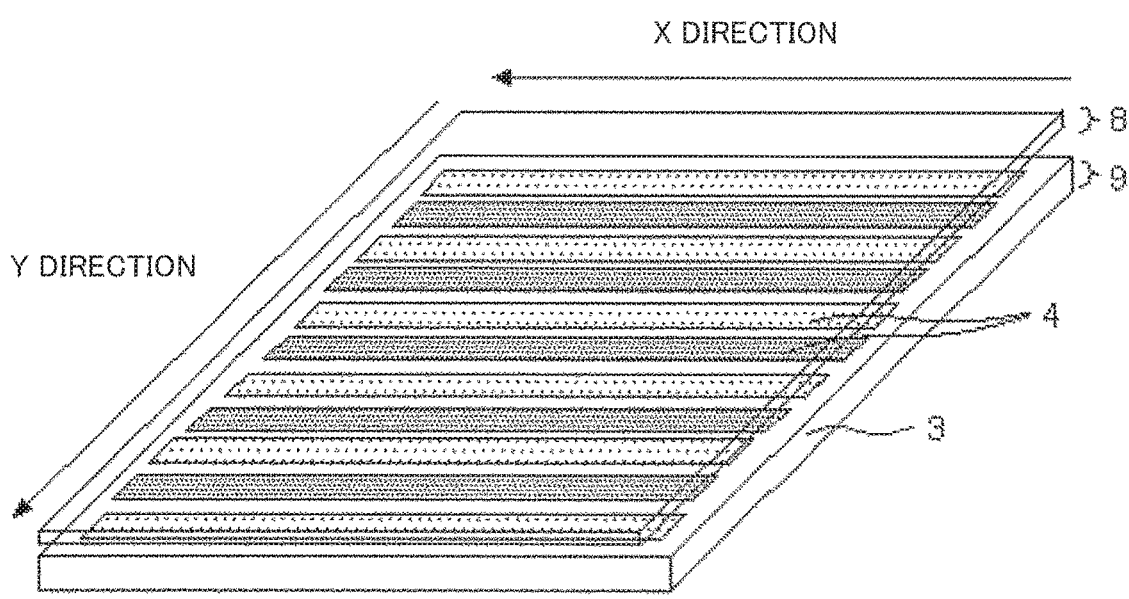
FIG. 6 is a perspective view illustrating a positional relation between sensor substrates of the resistive touch panel according to Embodiment 1.

Second, a transparent conductive film is formed, by using a conductive material such as indium tin oxide (ITO), on a surface of a bottom-plate sensor substrate 3 (a second substrate) of the resistive touch panel made of a transparent substrate such as a glass substrate or a plastic substrate, and patterning is performed thereon by using the known photolithography technique, a metal mask, or the like, such that bottom-plate sensor electrodes 4 made of strip-shaped transparent conductive films are formed thereon, to prepare a lower substrate (a bottom-plate sensor 9) of the resistive touch panel (see FIGS. 5 and 6). The bottom-plate sensor electrodes 4 are electrodes divided in a strip shape in a predetermined side direction (preferably the Y direction of FIG. 6, that is a longer-side direction) of the bottom-plate sensor substrate 3, and as illustrated in FIGS. 7 and 8, the divided electrodes are alternately allocated to a transmission electrode 14a, a reception electrode 15a, a transmission electrode 14b, a reception electrode 15b, a transmission electrode 14c, and . . . . Further, the bottom-plate sensor electrode 4 may be a shape extending in one direction of the bottom-plate sensor substrate 3, and the number, shape, and thickness thereof is not limited to the configuration illustrated in the drawings.

Third, the upper substrate and the lower substrate are disposed so that the overall transparent conductive film 2 and the bottom-plate sensor electrodes 4 face to each other, and are adhered to each other by using a seal material 5 such as a double-sided adhesive tape, an ultraviolet curable resin or a thermosetting resin, so as to maintain a predetermined gap therebetween (a gap material 6 such as an air layer or insulation liquid is interposed therebetween in a certain thickness) (see FIG. 5).

Fourth, an external lead-out wiring (a bottom-plate sensor input/output signal wiring 7) such as a flexible printed circuit (hereinafter, FPC) or a film electrode is pressure-bonded to the bottom-plate sensor electrode 4 on the bottom-plate sensor substrate 3 of the resistive touch panel, so as to be able to connect with the a resistive touch panel driving section 10.

Figure 10:
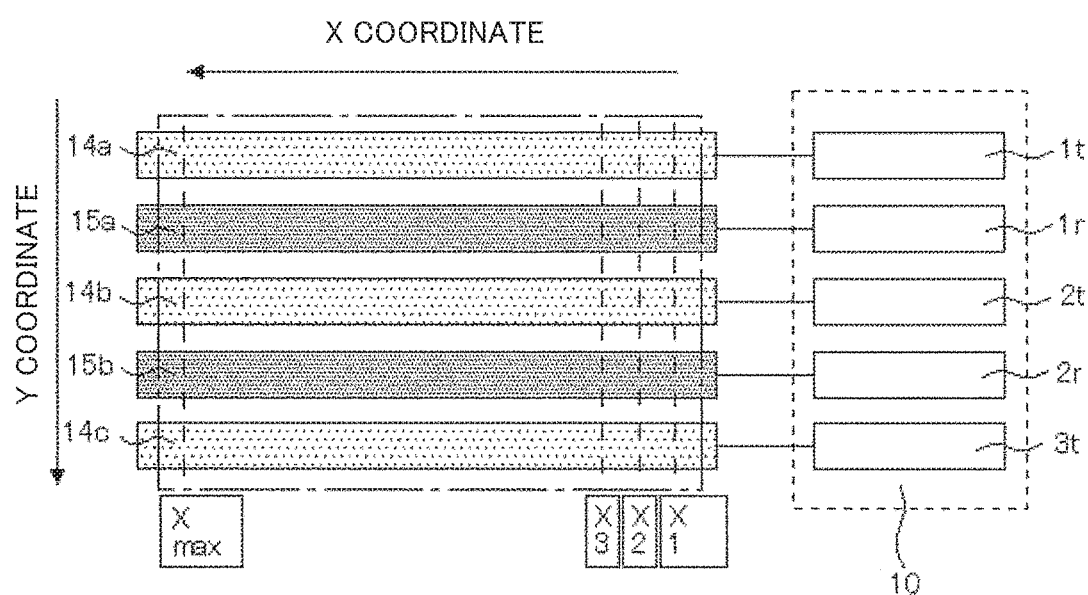
FIG. 10 is a view describing an X coordinate/a Y coordinate in strip-shaped electrodes according to Embodiment 1.
Figure 11:
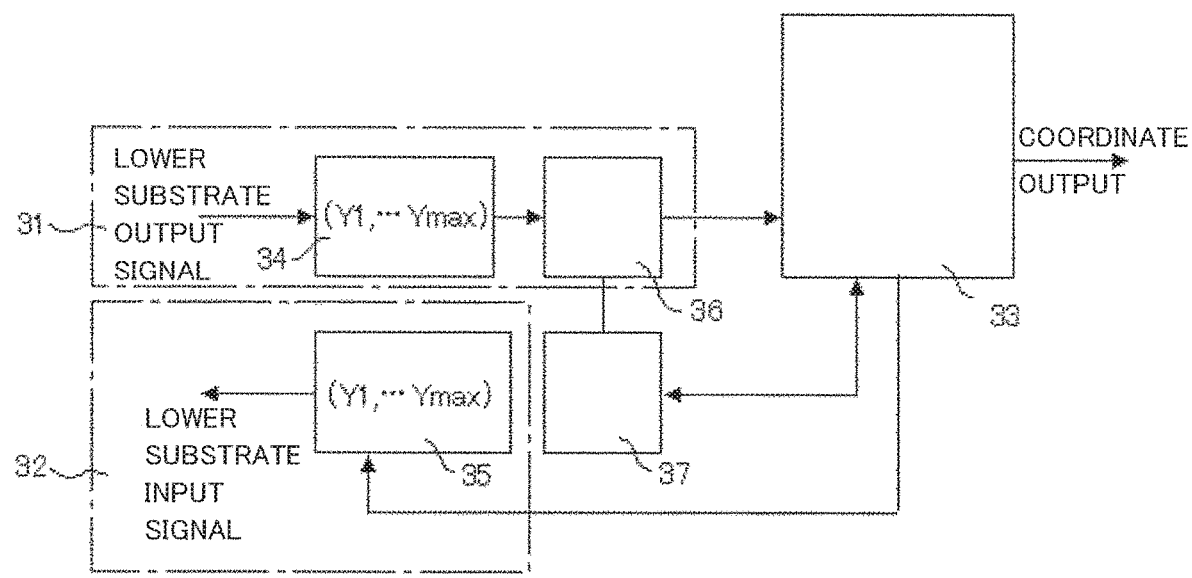
FIG. 11 is a block diagram illustrating a configuration example of a resistive touch panel driving section according to Embodiment 1.

Next, an operation of the resistive touch panel having the above-described structure will be described with reference to FIGS. 9A to 11. FIG. 9A to FIG. 9E are views illustrating the operation of the resistive touch panel of the present embodiment in this order in time sequence. In addition, FIG. 10 is a view describing an X coordinate/a Y coordinate, and FIG. 11 is a block diagram illustrating a configuration of the resistive touch panel driving section.

In the resistive touch panel of the present embodiment, in a case where a pulse waveform is transmitted from the transmission section to the transmission electrode of the resistive touch panel driving section, or a constant voltage is applied thereto, when a depression input is performed, the overall transparent conductive film 2 functions as a bridge between the transmission electrode and the reception electrode, and a voltage value attenuated according to a resistance value on a signal transmission path is detected by the reception section. In this regard, an X coordinate of a depression input position is determined based on the voltage value detected by the reception section, and a Y coordinate is determined based on a position of the reception electrode.

Figure 9A:
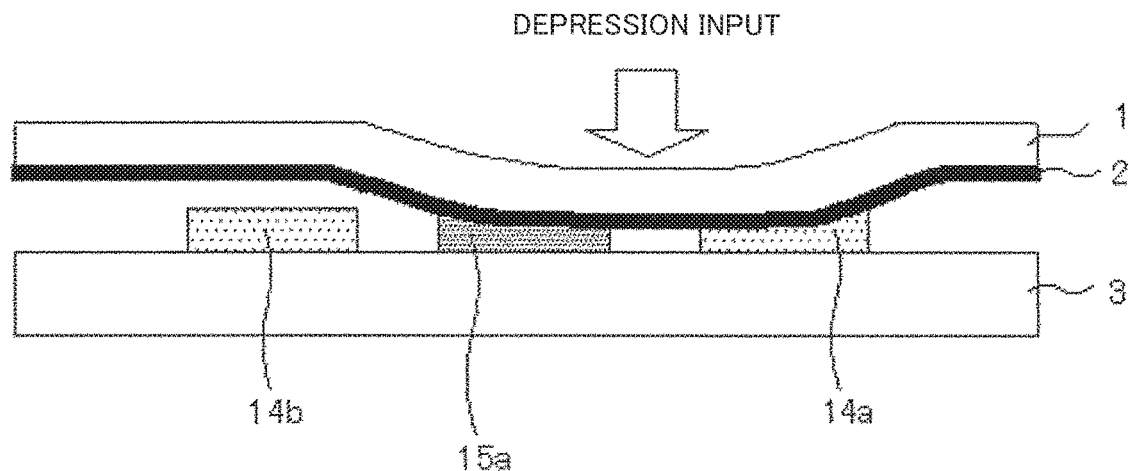
FIG. 9A is a transverse cross-sectional view illustrating a state where the resistive touch panel according to Embodiment 1 is depressed from a surface thereof.
Figure 9B:
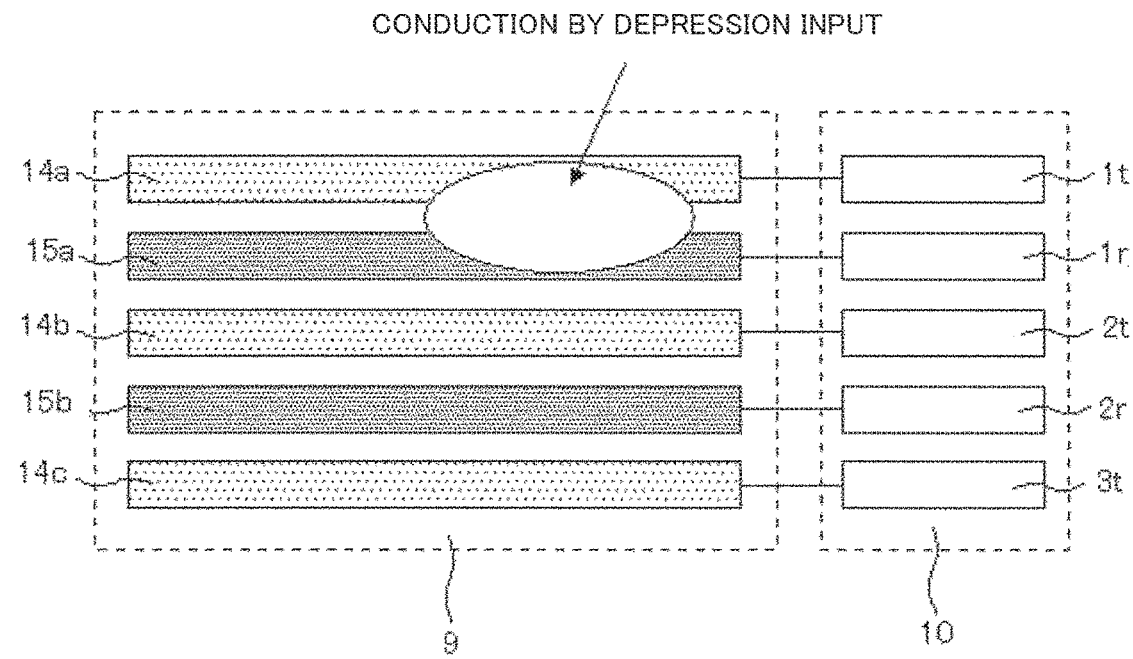
FIG. 9B is a view describing a contact of the electrodes on the bottom-plate sensor side in the state where the resistive touch panel according to Embodiment 1 is depressed from the surface thereof.

Specifically, when the depression input is performed as shown in FIG. 9A, as illustrated in FIG. 9B, the overall transparent conductive film 2 of the upper substrate (the upper-plate sensor substrate 1) at the depressed position contacts the transmission electrode (herein the transmission electrode 14a) and the reception electrode (herein the reception electrode 15a) of the lower substrate (the bottom-plate sensor substrate 3), so as to extend between these electrodes.

Figure 9C:
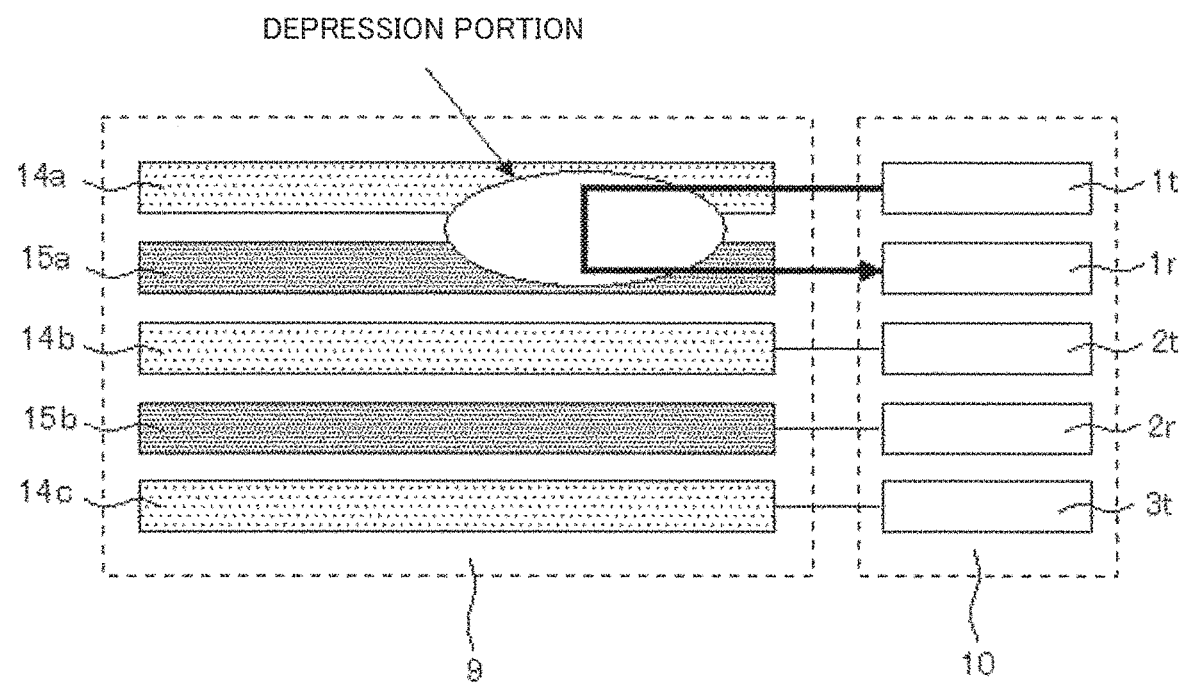
FIG. 9C is a view describing a signal transmission path in the state where the resistive touch panel according to Embodiment 1 is depressed from the surface thereof.
Figure 9D:
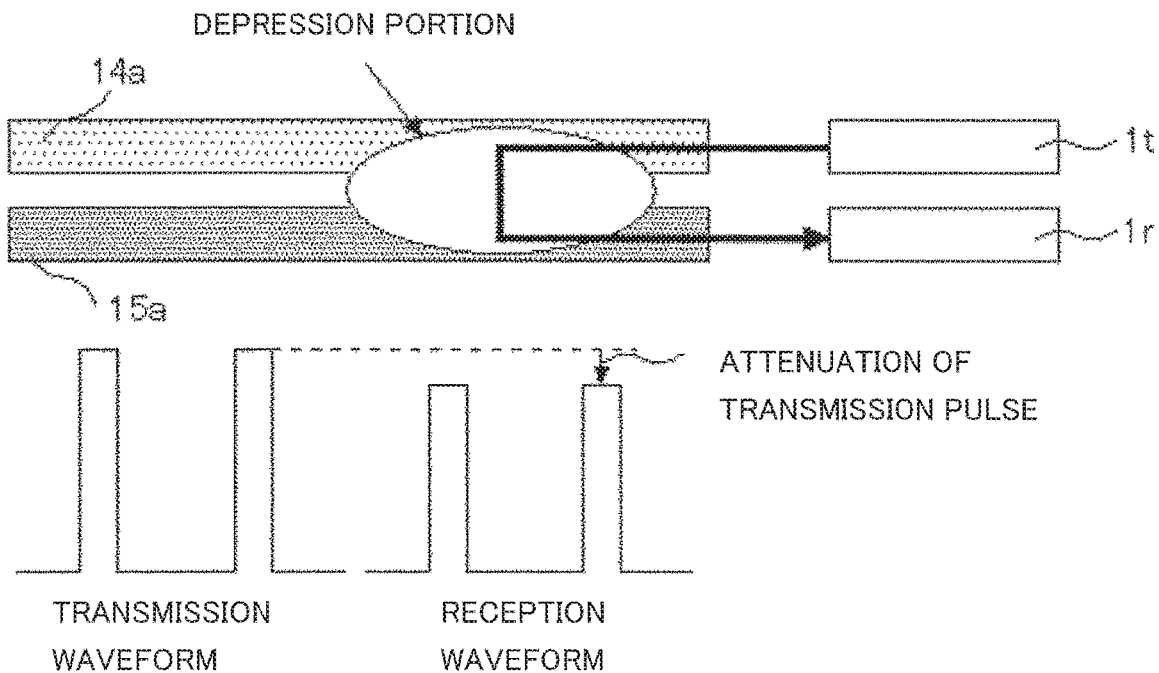
FIG. 9D is a view illustrating the signal transmission path and a transmission waveform/a reception waveform in a state where a position near a transmission section/a reception section of the resistive touch panel according to Embodiment 1 is depressed.
Figure 9E:
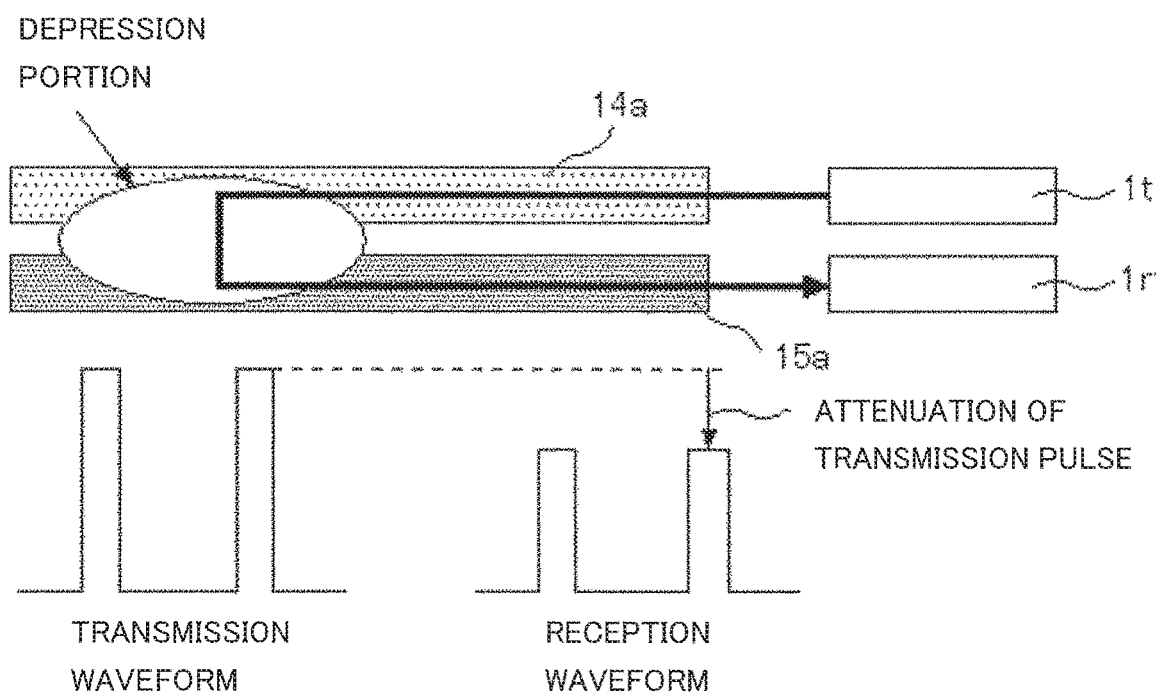
FIG. 9E is a view illustrating the signal transmission path and the transmission waveform/the reception waveform in a state where a position away from the transmission section/ the reception section of the resistive touch panel according to Embodiment 1 is depressed.

In this case, as illustrated in FIG. 9C, the upper overall transparent conductive film 2 functions as the bridge between the transmission electrode 14a and the reception electrode 15a, and a waveform transmitted from transmission sections 1t, 2t and 3t (herein the transmission section 1t) is transferred to reception sections 1r and 2r (herein the reception section 1r) through the reception electrode 15a. In this regard, when the depressed position is close to the transmission section and the reception section, the signal transmission path is shorter as illustrated in FIG. 9D, and voltage attenuation (an attenuation of a transmission pulse) of the pulse waveform caused by a resistance component of the signal transmission path is smaller. Meanwhile, when the depressed position is away from the transmission section and the reception section, the signal transmission path is longer as illustrated in FIG. 9E, and the voltage attenuation (the attenuation of the transmission pulse) of the pulse waveform caused by the resistance component of the signal transmission path is larger.

Accordingly, as illustrated in FIG. 10, when an operating range of the resistive touch panel is defined, the voltage attenuation of the pulse waveform at a portion (assumed to be X1) nearest to the resistive touch panel driving section 10 and a portion (assumed to be Xmax) farthermost therefrom is measured and stored, and by comparing the voltage attenuation at the time of performing the depression input with the previously stored voltage attenuation with respect to the X coordinate, it is possible to determine the X coordinate of the depressed position.

The above control will be specifically described. FIG. 11 illustrates the configuration of the resistive touch panel driving section 10. The resistive touch panel driving section 10 (detection section) includes a reception circuit 31, a transmission circuit 32, a storage section 37, and a coordinate processing section 33. The reception circuit 31 is provided with reception sections 34 of the same number as that of the reception electrodes, the reception section 34 is connected with the reception electrode respectively corresponding thereto. A pulse signal obtained by the reception section 34 is converted into a numerical value by an operation section 36 and the numerical value is output to the coordinate processing section 33. Also, the transmission circuit 32 is provided with transmission sections 35 of the same number as that of the transmission electrodes, and the transmission section 35 is connected with the transmission electrode respectively corresponding thereto, to transmit a pulse signal according to transmitting timing controlled by the coordinate processing section 33. Then, the coordinate processing section 33 compares a signal output from the reception circuit 31 with the signal stored in the storage section 37, and thereby determines the coordinates of the depressed position, to output a final coordinate position.

For example, the operation section 36 of the reception circuit 31 operates a voltage corresponding to the attenuation of the transmission pulse when each point of the X coordinate (X1 to Xmax) is depressed, and readably stores a value thereof in the storage section 37 such as a memory. Then, the coordinate processing section 33 compares an actual voltage value detected by the reception section 34 of the reception circuit 31 with the voltage values previously stored in the storage section 37, and thereby determines the X coordinate of the depressed position. Also, in relation to the Y coordinate, the respective reception electrodes are previously allocated to Y1 to Ymax, and the coordinate processing section 33 specifies the reception electrode which receives the attenuated waveform, thus to determine the Y coordinate of the depressed position.

As described above, by measuring the voltage attenuation of the pulse waveform according to the resistance value of the signal transmission path formed by the transmission electrode 14a, the overall transparent conductive film 2 and the reception electrode 15a, and comparing the measured voltage attenuation with the previously stored voltage attenuation, it is possible to specify the depressed position. Although FIGS. 9A to 9E describe the case in which one point is depressed, since the reception circuit 31 of the present embodiment is provided with the reception sections 34 of the same number as that of the reception electrodes, and the transmission circuit 32 is provided with the transmission sections 35 of the same number as that of the transmission electrodes, it is possible to simultaneously specify a pressed position extending between other transmission electrode and reception electrode. In addition, when two points are pressed at the same transmission electrode and the reception electrode, two signal transmission paths are formed, and the resistance value of that case is different from the resistance value of the case in which the respective points are pressed, such that it is possible simultaneously specify the pressed positions of the two points.

Figure 12:
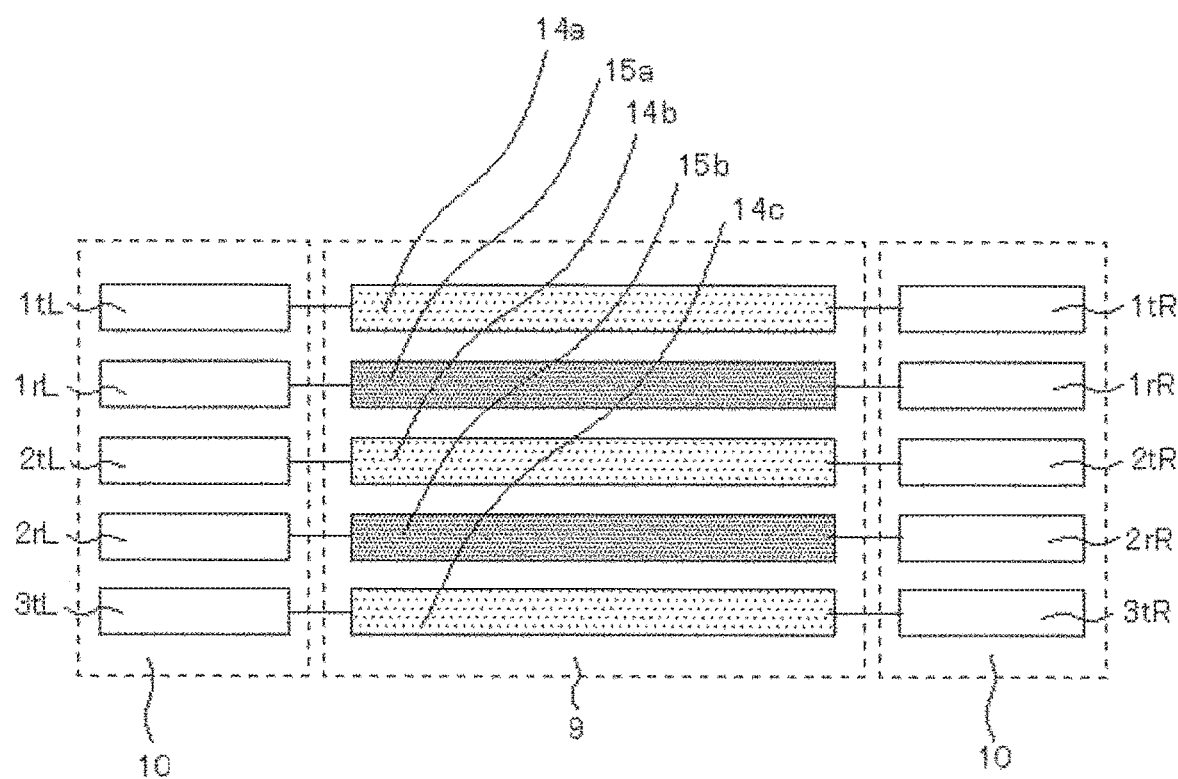
FIG. 12 is a view describing another example (a configuration capable of multi-point inputting with a high accuracy) of the resistive touch panel according to Embodiment 1.

Further, when achieving the determination of the simultaneous multi-point input with higher accuracy, as illustrated in FIG. 12, the strip-shaped transmission electrodes of the bottom-plate sensor 9 of the resistive touch panel are connected with transmission sections (1tR, 2tR, 3tR, and . . . MaxtR) for a right side and transmission sections (1tL, 2tL, 3tL, and . . . MaxtL) for a left side, and the reception electrodes thereof are connected with reception sections (1rR, 2rR, 3rR, and . . . ) for the right side and reception sections (1rL, 2rL, 3rL, and . . . ) for the left side. In addition, the transmission section 1tR to the transmission section MaxtR sequentially transmit a pulse signal, then the transmission section 1tL to the transmission section MaxtL sequentially transmit a pulse signal, as well as the reception section connected to the reception electrode adjacent to the transmission electrode to which the transmission section transmits the pulse signal receives the pulse signal, and by discriminating whether the received pulse signal is a pulse signal transmitted from the transmission section of any side, it is possible to specify coordinates of the pressed position with respect to any simultaneous multi-point input.

Figure 13A:
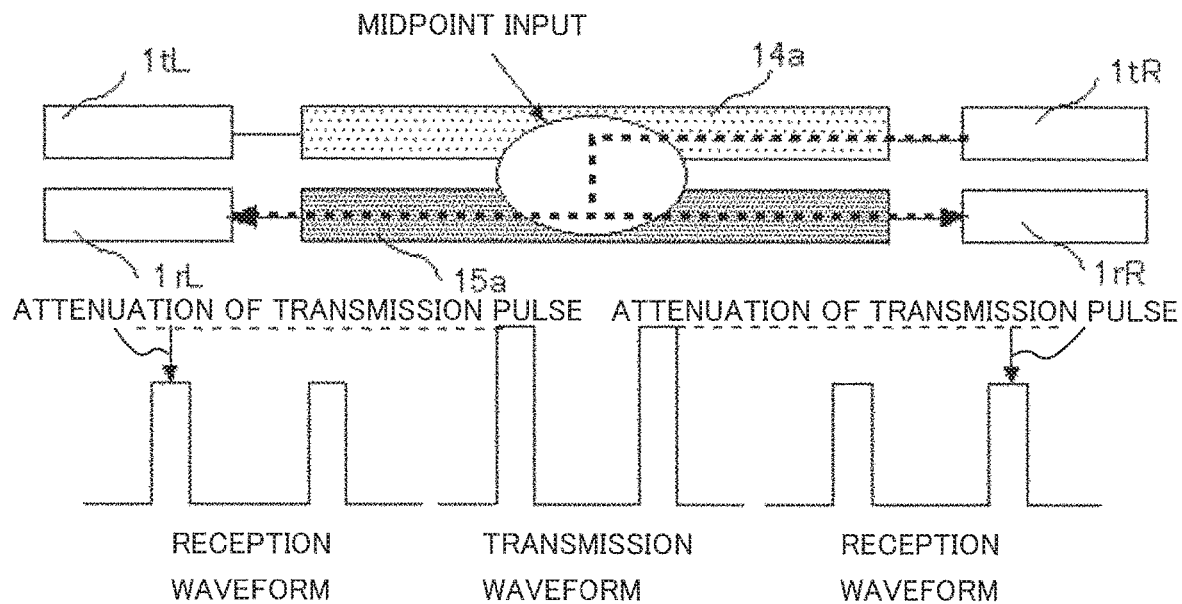
FIG. 13A is a view illustrating the signal transmission path and the transmission waveform/the reception waveforms in a midpoint input of the resistive touch panel having the configuration of FIG. 12.
Figure 13B:
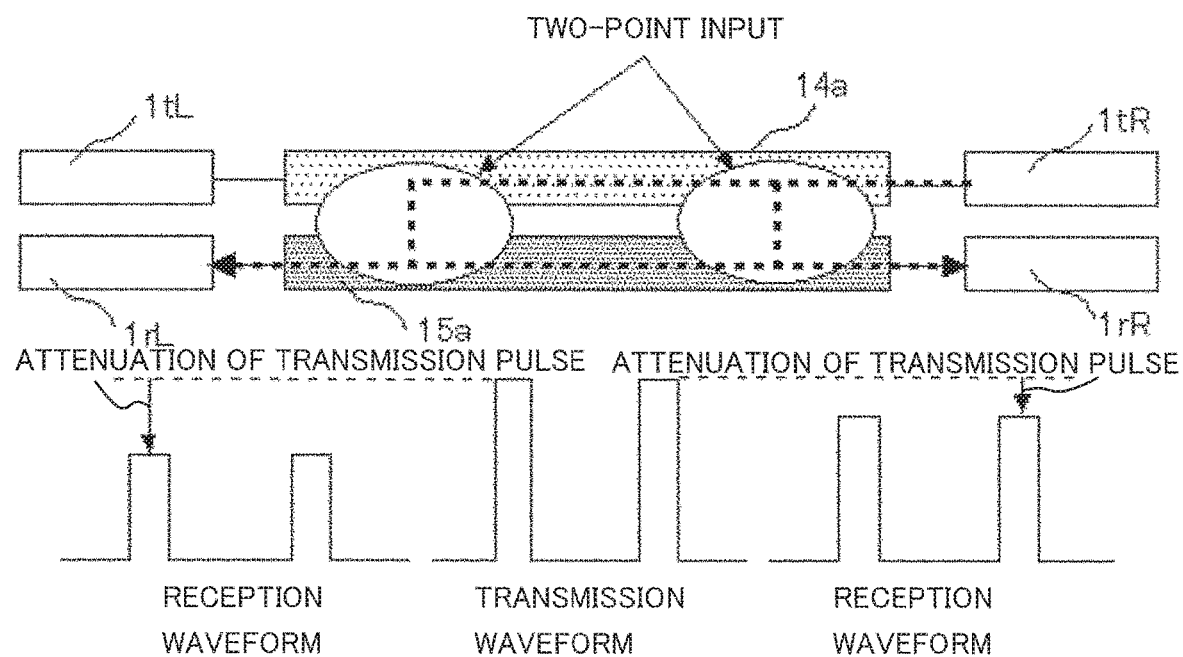
FIG. 13B is a view illustrating the signal transmission path and the transmission waveform/the reception waveforms in a two-point input of the resistive touch panel having the configuration of FIG. 12.

When two-point input is performed on the same reception electrode and transmission electrode, and the same waveform is transferred to the left and right reception section, in order to prevent a problem that it is erroneously determined as a one-point input to a midpoint of a resistance value on the signal transmission path, as illustrated in FIG. 13A, an attenuation of a transmission pulse in the case of a midpoint input is previously measured and stored in the storage section 37. In the case of the two-point input, as illustrated in FIG. 13B, lengths of the signal transmission paths at the left and right reception sections are different from each other, and an attenuation of a transmission pulse of the right reception section 1rR is smaller than the attenuation of the midpoint input, while an attenuation of a transmission pulse of the left reception section 1rL is larger than the attenuation of the midpoint input, and a magnitude relationship with respect to a transmission pulse to be transmitted from the left transmission section 1tL is reversed to the above-described case of the right transmission section 1tR, such that it is possible to easily discriminate the one-point input and the two-point input to the midpoint, and to detect the simultaneous multi-point input with higher accuracy.

Figure 14:
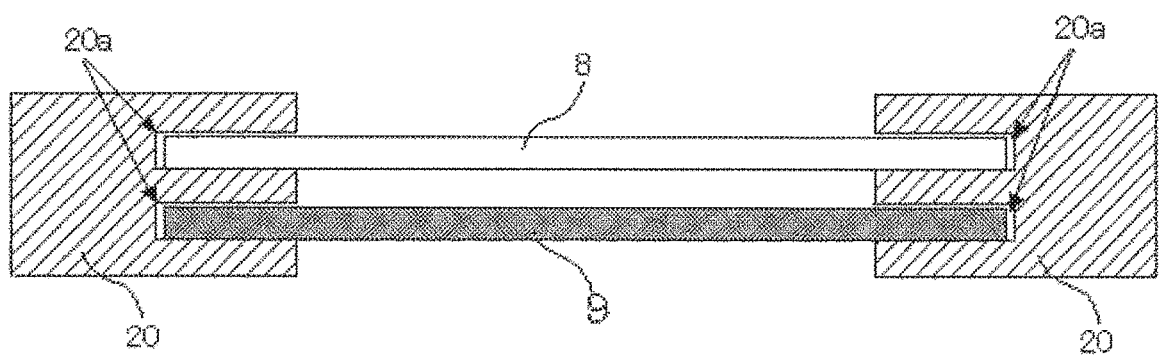
FIG. 14 is a transverse cross-sectional view illustrating another example of a fixing method of the resistive touch panel according to Embodiment 1.

In the above description, the upper-plate sensor 8 and the bottom-plate sensor 9 are bonded to each other by the seal material 5, but it may also be a structure in which the upper-plate sensor 8 and the bottom-plate sensor 9 are not bonded to each other. FIG. 14 is a transverse cross-sectional view illustrating the structure of the resistive touch panel in the above-described case. In the resistive touch panel having this structure, after preparing the upper-plate sensor 8 and the bottom-plate sensor 9 as individual pieces, it is only necessary to insert the upper-plate sensor 8 and the bottom-plate sensor 9 into slits 20a which are previously provided in a certain interval in a structure 20, such that a process of bonding the upper-plate sensor 8 and the bottom-plate sensor 9 to each other is unnecessary, and the resistive touch panel can be manufactured at a lower cost. When any one of the upper-plate sensor 8 and the bottom-plate sensor 9 is damaged, it may be easily replaced or repaired. In the case of this structure, in order to easily replace or repair the sensor, it is preferable that the upper-plate sensor 8 and the bottom-plate sensor 9 are fixed to the slits 20a by fitting means previously provided in both of the sensors and slits, without fixing the upper-plate sensor 8 and the bottom-plate sensor 9 by an adhesive, a double-sided tape or the like.

Embodiment 2

Next, a composite touch panel according to Embodiment 2, a driving method thereof, and a display apparatus comprising the composite touch panel will be described with reference to FIGS. 15 to 19.

Figure 15:
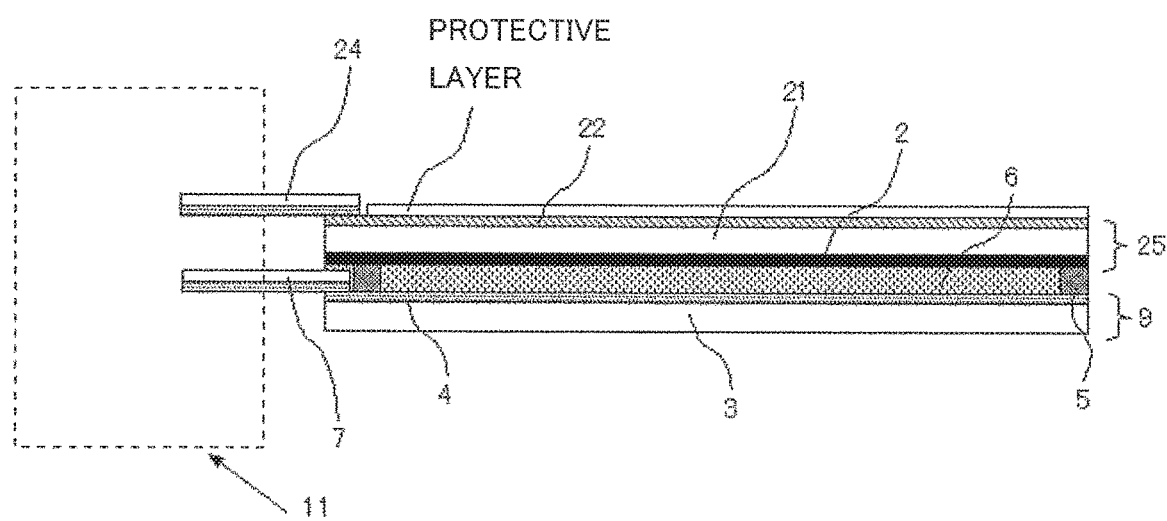
FIG. 15 is a transverse cross-sectional view illustrating a configuration of a composite touch panel according to Embodiment 2.

In the above-described Embodiment 1, the resistive touch panel has been described, but in Embodiment 2, a composite touch panel in which the resistive touch panel of Embodiment 1 and a projected capacitive touch panel are combined with each other will be described. First, a configuration of the composite touch panel will be described by using FIGS. 15 and 16, as well as FIGS. 7 and 8. FIG. 15 is a transverse cross-sectional view illustrating the structure of the composite touch panel, and FIG. 16 is a perspective view illustrating the positional relation between sensor substrates of the composite touch panel.

In the composite touch panel of Embodiment 2, first, a PCAP sensor electrode 22 made of a transparent conductive film is formed, by using a conductive material such as ITO, on a surface of a projected capacitive touch panel substrate (hereinafter, PCAP sensor substrate) 21 made of a transparent substrate such as a glass substrate or a plastic substrate, and an overall transparent conductive film 2 is formed, by using a conductive material such as ITO, on a rear surface of the PCAP sensor substrate 21, to prepare an upper substrate (a PCAP sensor 25) of the composite touch panel (see FIG. 15). The overall transparent conductive film 2 of the rear surface also plays a role of an upper electrode of the resistive touch panel, and shields the radiation noise occurring from the display apparatus such as an LCD to prevent a malfunction or a decrease in accuracy of the detected position of the PCAP sensor 25. Accordingly, it is preferable that the conductive film is formed on an entire surface of the PCAP sensor substrate 21 without performing the patterning. Further, the PCAP sensor electrode 22 may include, for example, a strip-shaped electrode pattern extending in a first direction, and a strip-shaped electrode pattern which is formed via an insulation film and extends in a second direction orthogonal to the first direction.

Figure 16:
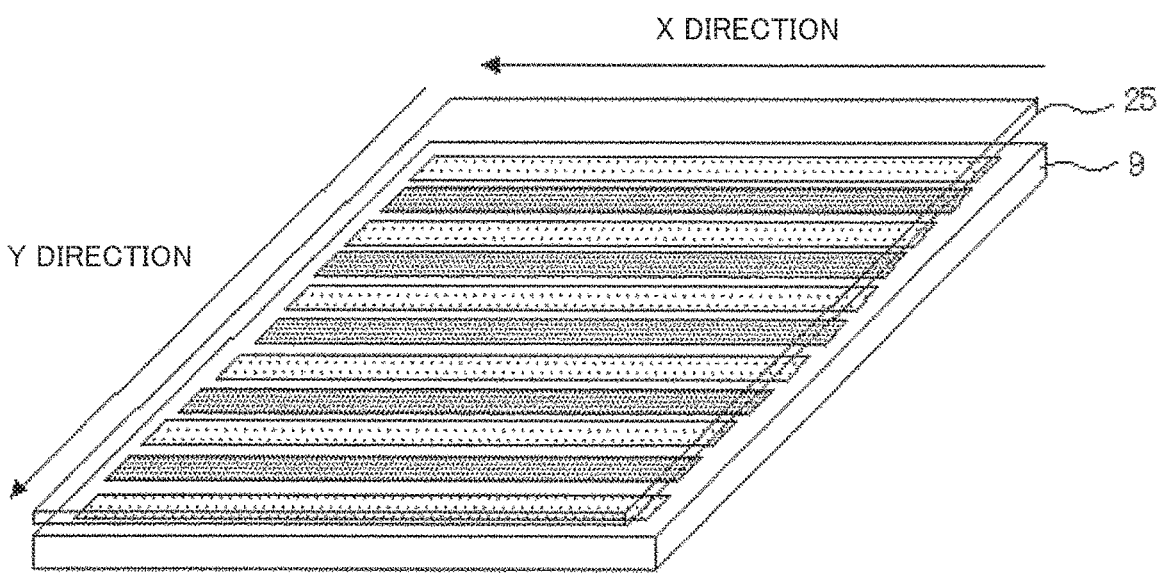
FIG. 16 is a perspective view illustrating the positional relation between sensor substrates of the composite touch panel according to Embodiment 2.

Second, a transparent conductive film is formed, by using a conductive material such as ITO, on a surface of the bottom-plate sensor substrate 3 of the resistive touch panel made of a transparent substrate such as a glass substrate or a plastic substrate, and patterning is performed thereon by using the known photolithography technique, a metal mask, or the like, such that bottom-plate sensor electrodes 4 made of strip-shaped transparent conductive films are formed thereon, to prepare a lower substrate of the composite touch panel (see FIGS. 15 and 16). The bottom-plate sensor electrodes 4 are electrodes divided in a strip shape in a predetermined side direction (preferably the Y direction, that is the longer-side direction) of the bottom-plate sensor substrate 3, and as illustrated in FIGS. 7 and 8, the divided electrodes are alternately allocated to the transmission electrode 14a, the reception electrode 15a, the transmission electrode 14b, a reception electrode 15b, a transmission electrode 14c, and . . . . Further, as with Embodiment 1, the bottom-plate sensor electrode 4 may be a shape extending in one direction of the bottom-plate sensor substrate 3, and the number, shape, and thickness thereof is not limited to the configuration illustrated in the drawings.

Third, the upper substrate and the lower substrate are disposed so that the overall transparent conductive film 2 and the bottom-plate sensor electrodes 4 face to each other, and are adhered to each other by using a seal material 5 such as a double-sided adhesive tape, an ultraviolet curable resin or a thermosetting resin, so as to maintain a predetermined gap therebetween (a gap material 6 such as an air layer or insulation liquid is interposed therebetween in a certain thickness) (see FIG. 15).

Fourth, an external lead-out wiring (a PCAP sensor input/output signal wiring 24, and the bottom-plate sensor input/output signal wiring 7) such as a flexible printed circuit or a film electrode is pressure-bonded to the PCAP sensor electrode 22 of the PCAP sensor 25 and the bottom-plate sensor electrode 4 of the bottom-plate sensor 9, so as to be able to connect with a composite touch panel driving section 11.

Next, an operation of the composite touch panel having the above-described structure will be described with reference to FIG. 17. Further, the operation of the resistive touch panel is the same as Embodiment 1, and therefore will not be described. The PCAP sensor 25 is intermittently driven, and the resistive touch panel is driven by using timing in which the PCAP sensor 25 is not driven, such that it is possible to simultaneously determine coordinates of the both type touch panels, without damaging a shield effect due to the overall transparent conductive film 2 formed on the rear surface side of the upper substrate.

Figure 17:
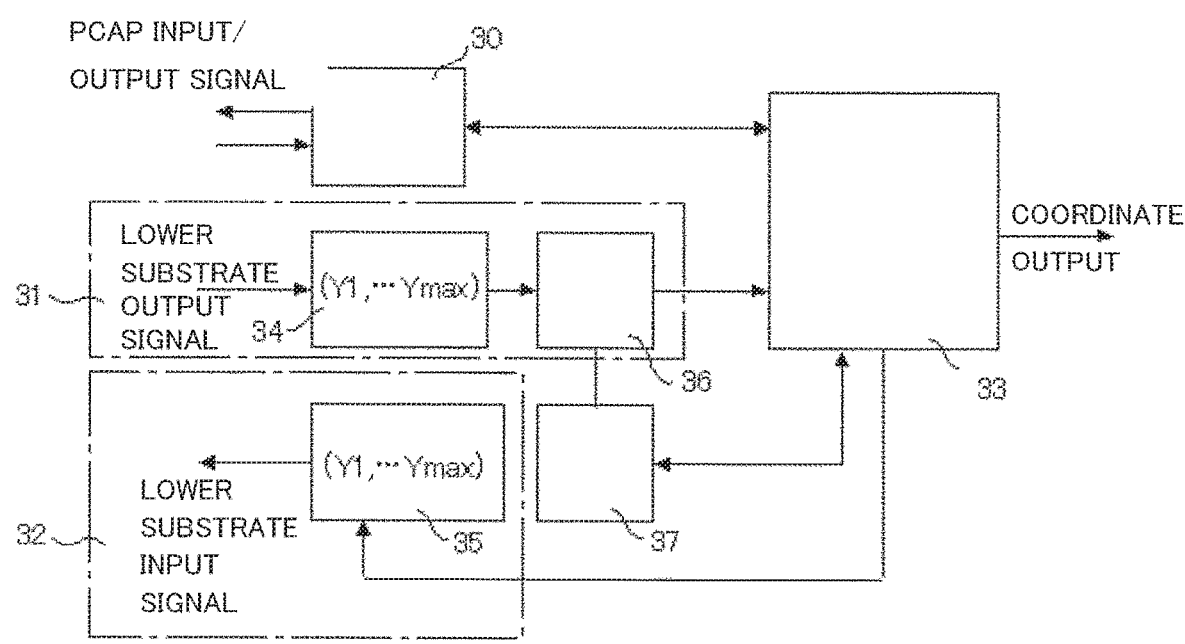
FIG. 17 is a block diagram illustrating a configuration example of a composite touch panel driving section according to Embodiment 2.

FIG. 17 illustrates the configuration of the composite touch panel driving section 11. The composite touch panel driving section 11 includes a reception circuit 31, a transmission circuit 32, a storage section 37, a PCAP driving section 30, and a coordinate processing section 33. The reception circuit 31 is provided with reception sections 34 of the same number as that of the reception electrodes, the reception section 34 is respectively connected with the reception electrode. A pulse signal obtained by the reception section 34 is converted into a numerical value by an operation section 36 and the numerical value is output to the coordinate processing section 33. Also, the transmission circuit 32 is provided with transmission sections 35 of the same number as that of the transmission electrodes, and the transmission section 35 is respectively connected with the transmission electrode, to transmit a pulse signal according to transmitting timing controlled by the coordinate processing section 33. In addition, the PCAP driving section 30 detects a difference in a capacitance between the strip-shaped electrode pattern extending in the first direction and the strip-shaped electrode pattern extending in the second direction, to thus determine input coordinates. Then, the coordinate processing section 33 outputs a final coordinate position, based on the coordinate determination results of the PCAP sensor 25 output by the PCAP driving section 30 and the coordinate determination results obtained by comparing a signal output from the reception circuit 31 with the signal stored in the storage section 37.

As described above, by combining the resistive touch panel of Embodiment 1 with the projected capacitive touch panel, and using the overall transparent conductive film 2 of the resistive touch panel, it is possible to shield the radiation noise occurring from the display apparatus such as an LCD, and thereby easily form the composite touch panel in which the malfunction due to the radiation noise is controlled. In addition, the resistive touch panel is driven at timing in which the PCAP sensor 25 is not driven, and a selection of the coordinate determination of the PCAP sensor 25 and the resistive touch panel is performed by the coordinate processing section 33, such that it is possible to determine the two-point simultaneous touch, even when the position detection of capacitive type cannot be performed.

Figure 18:
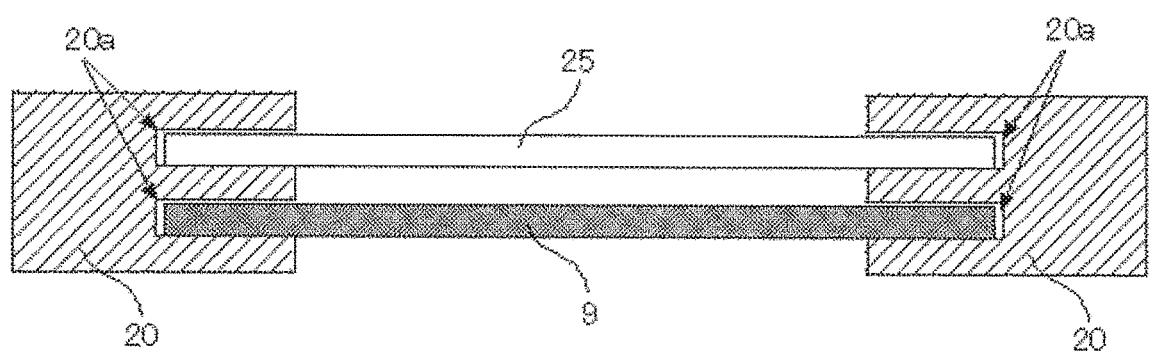
FIG. 18 is a transverse cross-sectional view illustrating another example of the fixing method of the composite touch panel according to Embodiment 2.

In the above description, the PCAP sensor 25 and the bottom-plate sensor 9 are bonded to each other by the seal material 5, but it may also be a structure in which the PCAP sensor 25 and the bottom-plate sensor 9 are not bonded to each other. FIG. 18 is a transverse cross-sectional view illustrating the structure of the composite touch panel in the above-described case. In the composite touch panel having this structure, after preparing the PCAP sensor 25 and the bottom-plate sensor 9 as individual pieces, it is only necessary to insert the PCAP sensor 25 and the bottom-plate sensor 9 into slits 20a which are previously provided in a certain interval in a structure 20, such that a process of bonding the PCAP sensor 25 and the bottom-plate sensor 9 to each other is unnecessary, and the composite touch panel can be manufactured at a lower cost. When any one of the PCAP sensor 25 and the bottom-plate sensor 9 is damaged, it may be easily replaced or repaired. In the case of this structure, in order to easily replace or repair the sensor, it is preferable that the PCAP sensor 25 and the bottom-plate sensor 9 are fixed to the slits 20a by the fitting means previously provided in both of the sensors and slits, without fixing these sensors by an adhesive, a double-sided tape or the like.

Figure 19:
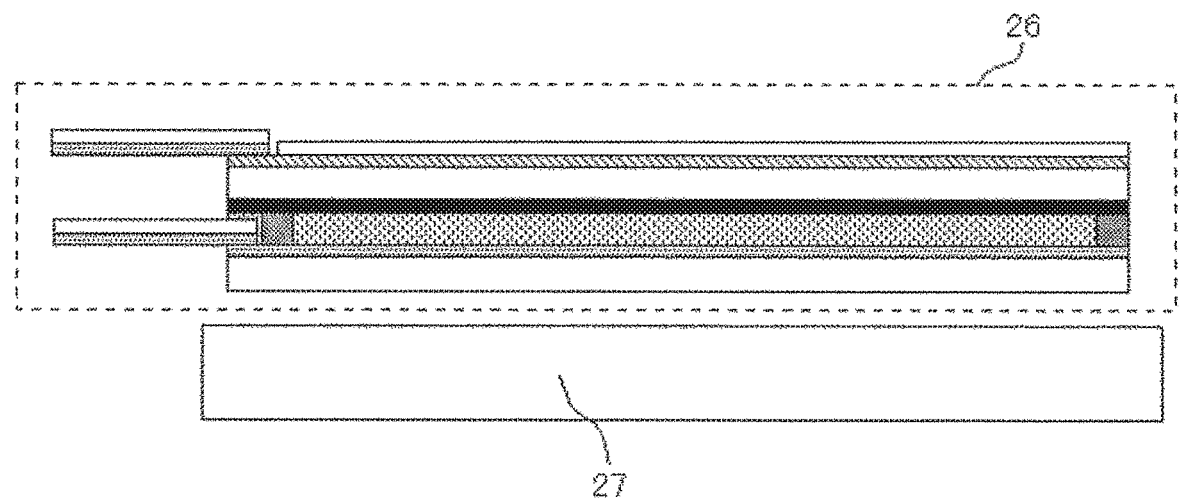
FIG. 19 is a transverse cross-sectional view illustrating an example of a display apparatus on which the composite touch panel according to Embodiment 2 is mounted.

In addition, since the composite touch panel having the above-described configuration shields the radiation noise occurring from the display apparatus, as illustrated in FIG. 19, by disposing a composite touch panel 26 of the present embodiment on a display section 27 such as an LCD or an organic electroluminescent display, it is possible to form a display apparatus 28 capable of detecting an input with high accuracy. Further, also by disposing the resistive touch panel of Embodiment 1 on the display section, it is possible to form the display apparatus capable of detecting the input with high accuracy.

According to the present embodiment, the transparent conductive film electrically floating is disposed on the upper substrate on the entire surface thereof, and a plurality of divided strip-shaped transparent conductive films are disposed on the lower substrate so that both substrates face each other at a predetermined interval, to detect a touch based on a voltage according to a variation of the transmission path detected by the reception section connected to the transparent electrode which is the strip-shaped transparent conductive film of the lower substrate. Thereby, it is possible to detect a two-point simultaneous touch with high accuracy even on the same electrode, and to provide the resistive touch panel capable of simplifying the configuration of the touch panel substrate or a connection wiring, and downsizing the driving section at a lower cost.

In addition, according to the present embodiment, when combining the above-described resistive touch panel with the projected capacitive touch panel, the transparent conductive film of the upper substrate of the resistive touch panel may be used as the shield layer, and therefore, it is possible to form the composite touch panel capable of effectively controlling the malfunction due to the radiation noise occurring from the LCD, or the like with a simple configuration.

Further, it should be understood that the present invention is not limited to the above-described examples, the structure and controlling method thereof may be appropriately modified, without departing from the spirit of the present invention.

For example, Embodiment 2 describes the case in which the resistive touch panel of Embodiment 1 and the projected capacitive touch panel are combined with each other, but it is possible to combine the resistive touch panel of Embodiment 1 with the other type touch panel.

The present embodiment may be used in the resistive touch panel, and the composite touch panel in which the resistive touch panel and the projected capacitive touch panel are combined with each other, as well as the driving method of these touch panels, and the display apparatus comprising these touch panels.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A resistive touch panel, comprising:
   a first substrate including a transparent conductive film electrically floating on an entire surface thereof;
   a second substrate facing the transparent conductive film of the first substrate and including a plurality of strip-shaped electrodes including a transparent conductive film, each of the strip-shaped electrodes including a first side and a second side which is an opposite side of the first side, the plurality of strip-shaped electrodes including at least a first strip-shaped electrode and a second strip-shaped electrode which are adjacent each other; and
   a detection section configured to transmit a first signal to the first side of the first strip-shaped electrode, to receive a second signal from the first side of the second strip-shaped electrode adjacent to the first strip-shaped electrode, to calculate a difference value between a first voltage of the first signal and a second voltage of the second signal when the first and second strip-shaped electrodes are electrically connected to the transparent conductive film of the first substrate by a touch on the first substrate, and to detect a touch position based on the calculated difference value,
   wherein the first strip-shaped electrode is a transmission electrode and the second strip-shaped electrode is a reception electrode,
   the detection section is configured to:
      transmit the first signal to the first side of the transmission electrode by one or more transmission sections configured to transmit the first signal to the transmission electrode, and
      receive the second signal from the first side of the reception electrode by one or more reception sections configured to receive the second signal from the reception electrode, and
   the transmission electrode is only configured to be connected with the one or more transmission sections, and the reception electrode is only configured to be connected with the one or more reception sections.

2. The resistive touch panel according to claim 1, wherein the transmission electrode is connected to transmission sections, of the one or more transmission sections, on both sides of each transmission electrode, and the reception electrode is connected to reception sections, of the one or more reception sections, on both sides of each reception electrode.

3. The resistive touch panel according to claim 1,
   wherein the first substrate and the second substrate are bonded to each other via a seal material having a predetermined thickness.

4. The resistive touch panel according to claim 1,
   wherein the first substrate and the second substrate are fixed by a structure including slits formed therein at a predetermined interval.

5. A composite touch panel, comprising:
   the resistive touch panel according to claim 1; and
   a capacitive touch panel which is provided on a side of the first substrate of the resistive touch panel.

6. The composite touch panel according to claim 5,
   wherein the transparent conductive film of the first substrate serves as a shield film to block radiation noise occurring from a side of the second substrate.

7. A method of driving a resistive touch panel which includes a first substrate including a transparent conductive film electrically floating on an entire surface thereof, and a second substrate facing the transparent conductive film of the first substrate and including a plurality of strip-shaped electrodes including a transparent conductive film, each of the strip-shaped electrodes including a first side and a second side which is an opposite side of the first side, the plurality of the strip-shaped electrodes including at least a first strip-shaped electrode and a second strip-shaped electrode which are adjacent each other, the first strip-shaped electrode being a transmission electrode and the second strip-shaped electrode being a reception electrode, the transmission electrode being only configured to be connected with one or more transmission sections configured to transmit a first signal to the transmission electrode, the reception electrode being only configured to be connected with one or more reception sections configured to receive a second signal from the reception electrode, the method comprising:
   transmitting the first signal to the first side of the transmission electrode, that is only configured to be connected with the one or more transmission sections, by the one or more transmission sections;

receiving the second signal from the first side of the reception electrode, that is only configured to be connected with the one or more reception sections, by the one or more reception sections, connected to the reception electrode adjacent to the transmission electrode to which the first signal is transmitted;

calculating a difference value between a first voltage of the first signal and a second voltage of the second signal when the first and second strip-shaped electrodes are electrically connected to the transparent conductive film of the first substrate by a touch on the first substrate; and detecting a touch position based on the calculated difference value.

8. The method of driving a resistive touch panel according to claim 7, wherein the touch position is detected in a direction orthogonal to an extending direction of the strip-shaped electrodes, based on a position of the reception electrode connected to the reception section which receives the second signal.

9. The method of driving a resistive touch panel according to claim 7, wherein the touch position is detected in an extending direction of the strip-shaped electrodes, based on an attenuation of a waveform of the received second signal with respect to a waveform of the transmitted first signal.

10. The method of driving a resistive touch panel according to claim 9,
wherein the transmission electrode is connected to transmission sections, of the one or more transmission sections, on both sides of each transmission electrode, and the reception electrode is connected to reception sections, of the one or more reception sections, on both sides of each reception electrode, and
the touch position is detected in the extending direction of the strip-shaped electrodes, based on attenuations of waveforms of second signals received by the respective reception sections on both sides, with respect to a waveform of a first signal transmitted from the transmission section on one side.

11. The method of driving a resistive touch panel according to claim 10, wherein the touch position is detected in the extending direction of the strip-shaped electrodes, based on attenuations of waveforms of the second signals received by the respective reception sections on both sides, with respect to the waveform of the first signal transmitted from the transmission section on one side, and based on attenuations of waveforms of the second signals received by the respective reception sections on both sides, with respect to a waveform of a first signal transmitted from the transmission section on the other side.

12. A method of driving a composite touch panel which includes a resistive touch panel driven by the driving method according to claim 7, and a capacitive touch panel disposed on a side of the first substrate of the resistive touch panel, the method comprising:
intermittently driving the capacitive touch panel, and driving the resistive touch panel at timing in which the capacitive touch panel is not driven, to simultaneously perform a touch position determination by the capacitive touch panel and a touch position determination by the resistive touch panel.

13. A display apparatus comprising the resistive touch panel according to claim 1 mounted thereon.

14. A display apparatus comprising the composite touch panel according to claim 5 mounted thereon.

15. The resistive touch panel according to claim 1, further comprising a memory configured to store a plurality of touch position values and a plurality of difference values, each of the touch position values corresponding to each of the difference values respectively,
wherein the detection section is configured to detect a touch position value corresponding to the calculated difference value stored in the memory and to detect the touch position based on the detected touch position value.

16. The method of driving a resistive touch panel according to claim 7,
wherein the resistive touch panel further includes a memory configured to store a plurality of touch position values and a plurality of difference values, each of the touch position values corresponding to each of the difference values respectively, and
the method further comprises detecting a touch position value corresponding to the calculated difference value stored in the memory and detecting the touch position based on the detected touch position value.

17. The resistive touch panel according to claim 1, wherein the transparent conductive film functions as a bridge between the transmission electrode and the reception electrode when a depression input is performed such that a voltage value attenuated according to a resistance value on a signal transmission path is detected by the reception electrode.

* * * * *